United States Patent [19]

Bottoms et al.

[11] Patent Number: 4,815,105
[45] Date of Patent: Mar. 21, 1989

[54] SELECTIVE SIGNALLING ENCODER/DECODER FOR MULTIPOINT DATA COMMUNICATION NETWORKS

[75] Inventors: Stanley Bottoms, Seminole, Fla.; Guillermo Vega, Isla Verde, P.R.

[73] Assignee: Paradyne Corporation, Largo, Fla.

[21] Appl. No.: 35,608

[22] Filed: Apr. 7, 1987

[51] Int. Cl.$^4$ .............................................. H04L 27/00
[52] U.S. Cl. ......................................... 375/37; 375/7; 340/825.21
[58] Field of Search ........................... 375/7, 8, 13, 37; 370/92, 85; 340/825.21, 825.51, 825.52; 379/93.95

[56] References Cited

U.S. PATENT DOCUMENTS

| | | | |
|---|---|---|---|
| 4,085,449 | 4/1978 | Walsh et al. | 375/8 |
| 4,455,661 | 6/1984 | Qureshi | 375/8 |
| 4,489,416 | 12/1984 | Stuart | 375/13 |
| 4,672,630 | 6/1987 | Kaku | 375/13 |
| 4,689,786 | 8/1987 | Sidhu et al. | 370/92 |

OTHER PUBLICATIONS

David Hutchison, "Local Area Networks an Introduction Software & Microsystems", vol. 2, No. 4, Aug. 1983.

Primary Examiner—Robert L. Griffin
Assistant Examiner—Stephen Chin
Attorney, Agent, or Firm—Kane, Dalsimer, Sullivan, Kurucz, Levy, Eisele and Richard

[57] ABSTRACT

A selective secondary signalling encoder/decoder for multipoint data communications networks for use on transmission media such as telephone lines provides for selective signalling between a master broadcasting unit and however many slave units are in the network. The network functions by sending a standard (V-29) type modem training sequence and incorporating the address of the particular remote unit with which communication is desired in the data segment of the sequence. Compatibility is maintained with standard slave units that don't have this decoder by appending a sufficient number of marks to the address and message to allow for the standard starting value of a descrambler in the "data mode". When the segment is detected at each remote unit in the system, the address sent is compared to the address of the remote or slave unit. Upon a comparison match, together with a synchronism check and error checks, a valid message flag is set, indicating to the remote unit that it has received a command from the master site and thus the selected remote can be retrained or send a new sequence back to the master. Thus, instead of having to broadcast the same command to all remotes, individual remotes can be singled out to retrain back to the master so the time overhead in the network is significantly reduced since only one unit will be sending back training information to the master.

7 Claims, 5 Drawing Sheets

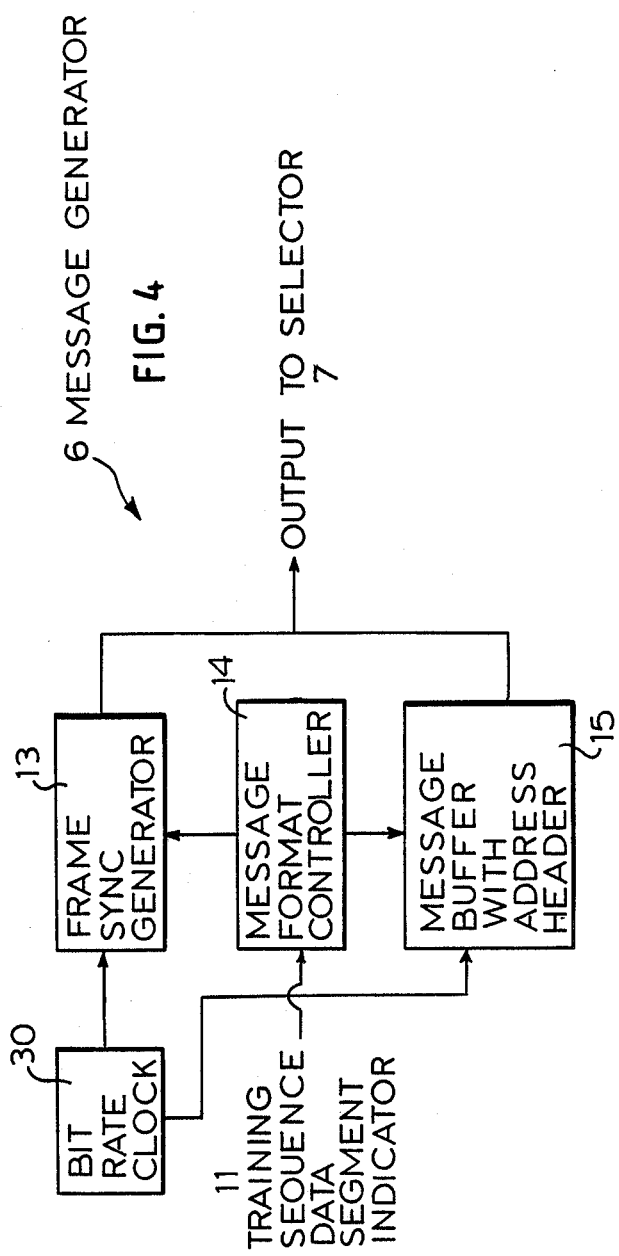
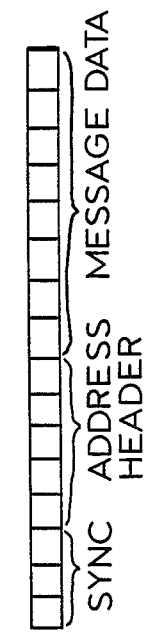

SELECTIVE SIGNALLING ENCODER/DECODER FOR MULTIPOINT DATA COMMUNICATION NETWORKS

BACKGROUND OF THE INVENTION

1. Field of the Invention

This invention pertains to digital modems used for exchanging digital data over communication lines in a multipoint data communications network. For the purposes of this application, the terms "modem" and "digital communications equipment" (DCE) can be considered to be equivalent.

2. Description of the Prior Art

Prior art multipoint data communications networks utilized a training mode of operation in which standard sequences of training signals were sent from a master unit of digital communications equipment to a plurality of slave digital communications equipment units. However, no provision was made for separately training individual remote (slave) units in the multipoint network. A "training period" may be defined as the period before data exchange when each modem is given a time to set its operating parameters such as equalizing coefficients, automatic gain control levels, etc.

OBJECTIVE AND SUMMARY OF THE INVENTION

The primary objective of the invention is to allow a master unit of digital communications equipment (DCE) to selectively train a plurality of slave DCE units in a multipoint data communications network, while having the ability to maintain data mode compatibility with a standard slave unit that doesn't have this capability. Achievement of this objective will allow considerable overhead in a network to be saved because only a selected unit will be sending training information back to the master unit, rather than having as many times the amount of training information being sent back to the master unit as there are remote units in the network. Also standard slave units can be left in the network without data terminal equipment "data mode" compatibility problems thus eliminating the need to replace all slave units in the network immediately.

Other objectives and advantages will become apparent from the following description.

The network of the present invention functions by sending a standard modem training sequence and incorporating the address of the particular remote station for which training is desired at the end of the training sequence in the segment of the sequence reserved for data transmission. When the address code is detected at each slave (drop) unit in the system, the address is compared to the address of the slave unit. Upon a comparison match, together with a synchronism check, a valid message flag is set, indicating to the remote unit that it has a received a command from the master site. At this point the selected slave unit can be retrained or send a new sequence back to the master. Thus, instead of having to broadcast the same command to all remote units, individual remotes can be singled out to retrain back to the master so the time overhead in the network is not as great since only one unit will be sending back training information to the master.

BRIEF DESCRIPTION OF THE DRAWINGS

FIG. 4 is a schematic of the message generator of the invention.

FIG. 5 shows the message format of the invention.

DESCRIPTION OF THE PREFERRED EMBODIMENT

Figure 1:
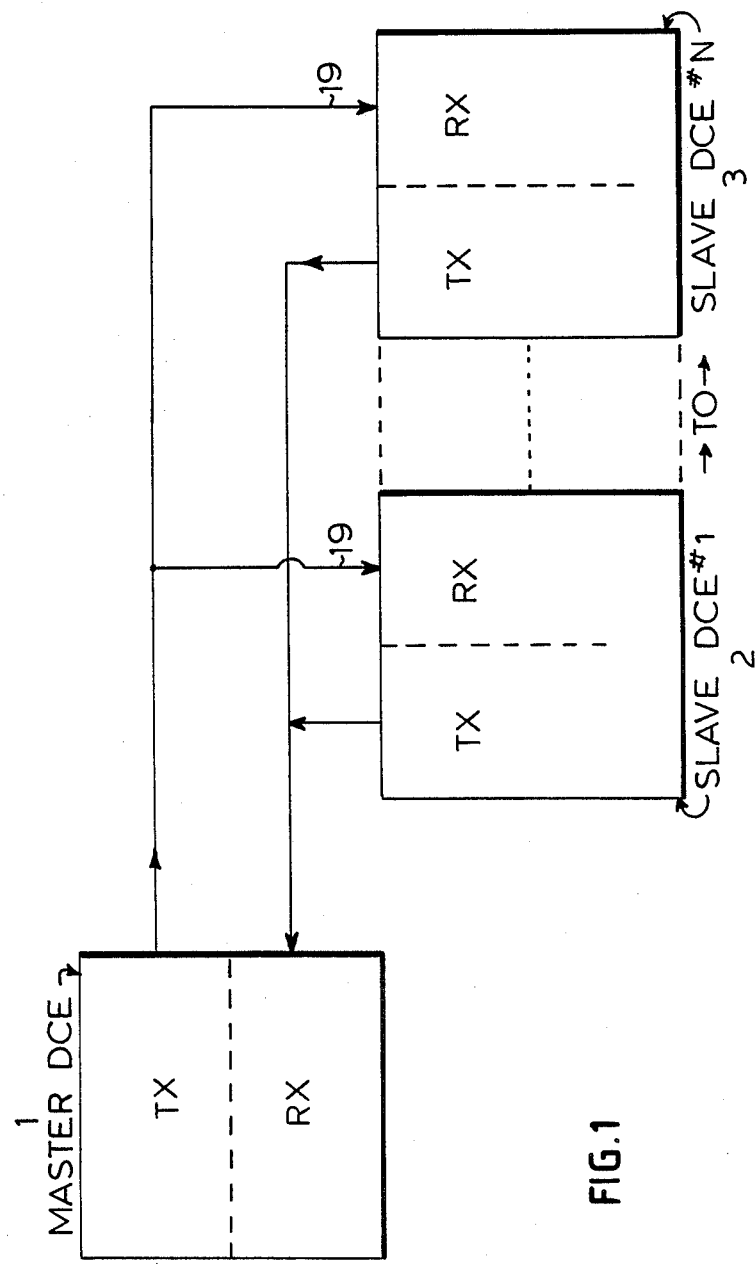
FIG. 1 is an overall schematic of the multipoint data communications network of the present invention.

FIG. 1 shows mater DCE 1 connected to slave DCE's 2 and 3. Slave DCE 3 is given the notation "N" to indicate that any number of remote units can be connected into the system. The configuration shown of two slave units is the standard full duplex multipoint configuration. The TX and RX notations in FIG. 1 are respectively transmitter and receiver at each of the locations in the network.

Figure 2:
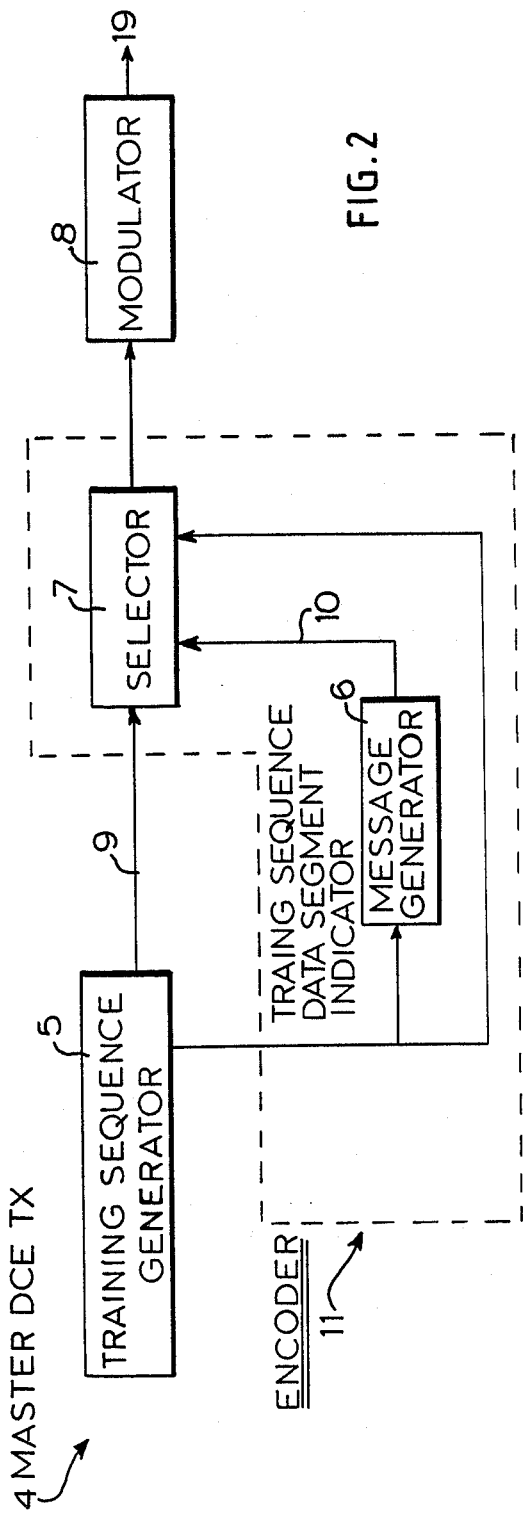
FIG. 2 is a schematic of the transmitter portion of the master DCE.
Figure 3:
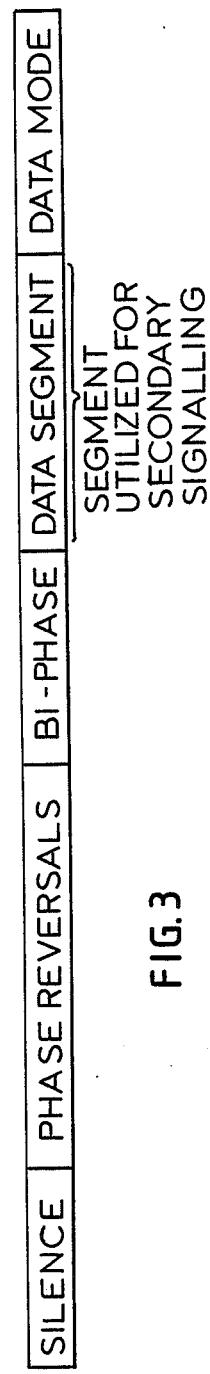
FIG. 3 shows the standard training sequence format used in a preferred embodiment of the invention.

FIG. 2 discloses the master DCE transmitter 4 which comprises a training sequence generator 5, message generator 6, and selector 7. In the ordinary operation of a modem for data communications equipment, training sequence generator 5 would operate directly into modulator 8 which would modulate its digital pattern onto a carrier wave for transmission on a communications media 19, which might be a telephone line. However, in the operation of the present invention, the sequencing has been tapped into such that a flag is generated to indicate when the data segment (FIG. 3) begins in the sequence of an industry standard v. 29 training sequence. At that point, control is issued to selector 7 to turn off the standard marking pattern that is sent during the data segment of the standard training sequence. Selector 7 now takes the output of a message generator 6 and conveys that output to modulator 8. After the message from generator 6 has been conveyed and the appended marks transmitted, the sequence is returned to normal or goes into the data mode (FIG. 3).

The above-mentioned flag is generated by a state machine which goes from state to state to produce a sequence or state indicator which is used as a gating signal to the message generator 6 as well as the selector 7. Line 11 indicates the path of this flag from training sequence generator 5 to selector 7, indicating that the selector 7 should now take the output from message generator 6 along line 10 rather than the output from training sequence generator 5 along line 9.

As shown in FIG. 4, message generator 6 comprises a frame sync generator 13, message format controller 14, a message buffer with address header 15, and a bit rate clock 30 (a standard unit of the data communications equipment) such that frame sync generator 13 can clock out the sync information and the controller 14 sets up then to send out the address information and whatever message has been buffered through buffer 15 which is also under the control of the bit rate clock. That data is sent out at the data rate and is clocked at the data rate, which process is initiated by training sequence data segment indicator 11. The output of the process is data being sent out at the standard modem data rate to selector 7. The message format controller also appends a sufficient number of marks to establish a common starting point for the "data mode" to maintain compatibility with a slave receiver that doesn't have this selective decoder function.

Figure 6:
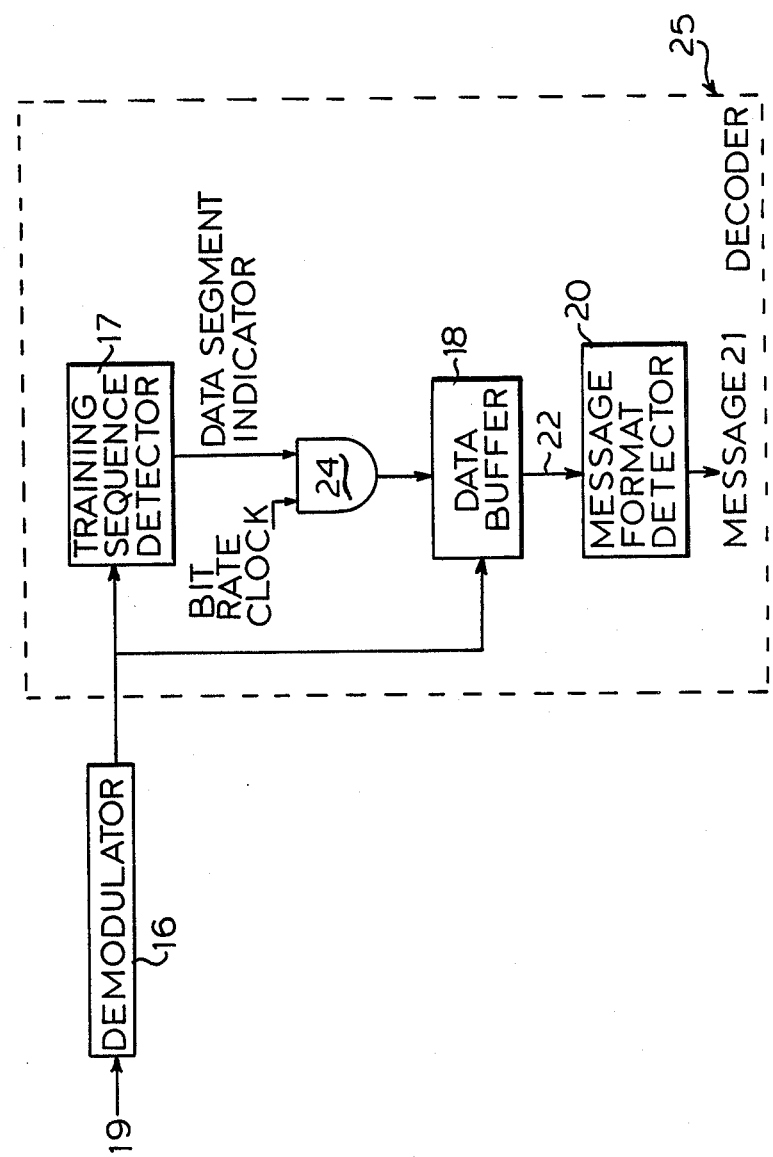
FIG. 6 is a schematic of the receiver of the slave units of the network.

In FIG. 6, the receiver section of a slave DCE is disclosed. The output from the master DCE is received along line 19 and passes through a standard demodulator 16. The signal then passes into a decoder 25 comprising training sequence detector 17, AND gate 24, data buffer 18, and message format detector 20. When the data segment portion of a message (FIG. 3) is reached, training sequence detector 17 produces an output to AND gate 24. This input to the AND gate, together with the bit rate clock input, cause the incoming data to enter data buffer 18. Message format detector 20 then checks buffer 18 to determine that sync is present, that the appropriate address is present, and that the redundancy used for error checking is also present. Once all of these criteria have been checked, the message is output along line 21 and thereupon processed.

Figure 7:
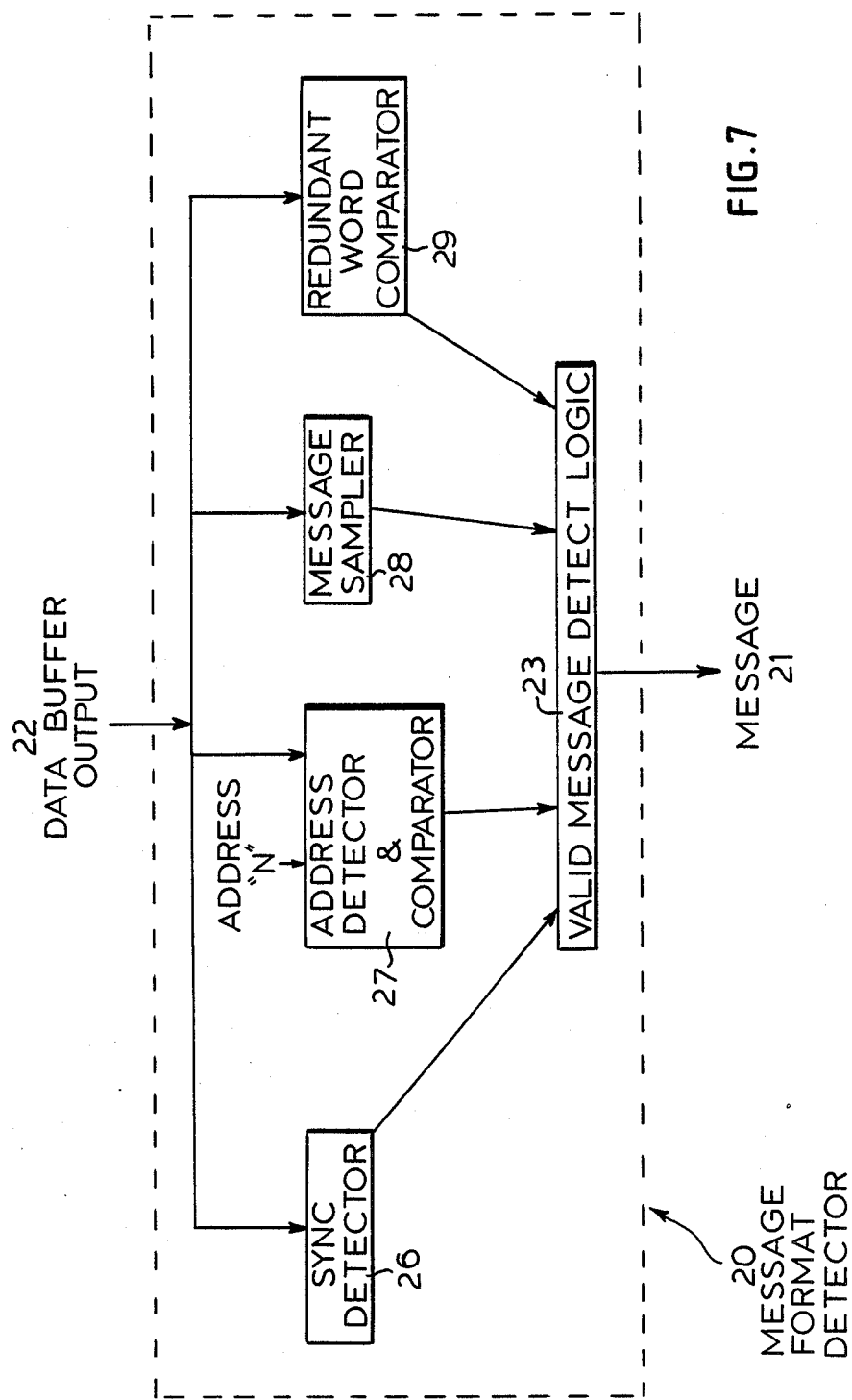
FIG. 7 shows a schematic of the message format detector of the invention.

Message format detector 20 is detailed in FIG. 7 and comprises sync detector 26, address detector and comparator 27, message sampler 28, and redundant word comparator 29. All of these elements operate on inputs from data buffer output 22 (FIG. 6). As mentioned previously, message format detector 20 checks for sync (detector 26), that the address of this particular slave DCE is being sent (detector and comparator 27), for the message through sampler 28, and for errors through redundant word comparator 29. Valid message detect logic 23 basically functions as an AND gate to assure that all of the proper inputs are present. If this is the case, the message is sent out on line 21. From there the message is conveyed to additional logic which may be used to implement a variety of functions. For example, logic could be constructed to use the signal on line 21 to trigger the sending of a message containing a longer equalizer conditioning pattern from this particular slave unit to the master.

While the invention has been particularly shown and described with reference to a preferred embodiment thereof, it will be understood by those skilled in the art that numerous modifications may be made to the invention without departing from its scope and spirit.

I claim:

1. A system for selective signaling in a multipoint data communications network comprising:
    a master unit of digital communications equipment;
    a plurality of slave units in communication with said master unit wherein a portion of said slave units have means responsive to a standard training sequence from said master unit and wherein a portion of said slave units do not have means responsive to a standard training sequence from said master unit;
    means for transmitting a standard training sequence format from said master unit of digital communications equipment to said plurality of slave units;
    means for interrupting said standard training sequence format to transmit the address of a particular slave unit and a message,;
    means for appending said message with a sufficient number of marks to establish a common starting point for said slave units thereby maintaining compatibility with said slave units not having said sequence responsive means;
    means for sensing said address at said particular slave unit whereby only said particular slave unit responds to said master unit during a subsequent transmission from said master unit.

2. The system of claim 1 wherein said means for interrupting comprises a training sequence generator, a selector, and a message generator, said selector receiving a flag signal from said training sequence generator indicating a data segment of said training sequence has begun whereupon said selector switches transmission to said slave unit from said training sequence generator to said message generator.

3. The system of claim 2 wherein said message generator comprises a frame sync generator, a message format controller connected to said frame sync generator, and a message buffer with address header connected to said message format controller wherein said flag signal from said training sequence data generator applied to said message format controller and a bit rate clock signal applied to said frame sync generator and to said message buffer with address header causes an output containing said address of a particular slave unit to be transmitted through said selector.

4. The system of claim 3 wherein said message formt controller is a state machine which cycles through information to generate a formatted messae with sync data, address header, and specific message data in a recurring fashion to facilitate redundancy and error checking at said slave units, prior to the operation of said appending means.

5. The system of claim 1 wherein said means for sensing said address comprises a comparator for detecting an address being sent from said master unit and comparing it with one stored in memory.

6. A system for selective signaling in a multipoint data communications network comprising:
    a master unit of digital communications equipment;
    a plurality of slave units in communication with said master unit wherein a portion of said slave units have means responsive to a standard training sequence from said master unit and wherein a portion of said slave units do not have means responsive to a standard training sequence from said master unit;
    means for transmitting a standard training sequence format from said master unit of digital communications equipment to said plurality of slave units;
    means for interrupting said standard training sequence format to transmit the address of a particular slave unit and a message;
    means for appending said message with a sufficient number of marks to establish a common starting point for said slave units thereby maintaining compatibility with said slave units not having said sequence responsive means;
    means for sensing said address at said particular slave unit whereby only said particular slave unit responds to said master unit during a subsequent transmission from said master unit;
    wherein said means for sensing said address comprises a training sequence detector, a data buffer connected to the output of said training sequence detector, and a message format detector connected to the output of said data buffer wherein when an indication that said standard training sequence format has reached a data segment is received at said training sequence detector, said training sequence detector produces an output which together with a clock input energizes said data buffer which is scanned by said message format detector before a message is output therefrom and thereupon processed.

7. The system of claim 6 wherein said message format detector contains a sync detector, address detector and comparator, message sampler and redundant word comparator, all having inputs from said data buffer, and valid message data logic into which all of said elements having inputs from said data buffer have parallel outputs whereby said valid message detect logic determines whether a message should be output therefrom and thereupon processed.

* * * * *